June 22, 1965

R. M. ENGLISH 3,190,467

AUTOMOBILE PARKING SYSTEM

Filed Dec. 26, 1962

INVENTOR.
RALPH M. ENGLISH

June 22, 1965
R. M. ENGLISH
3,190,467
AUTOMOBILE PARKING SYSTEM
Filed Dec. 26, 1962
8 Sheets-Sheet 2
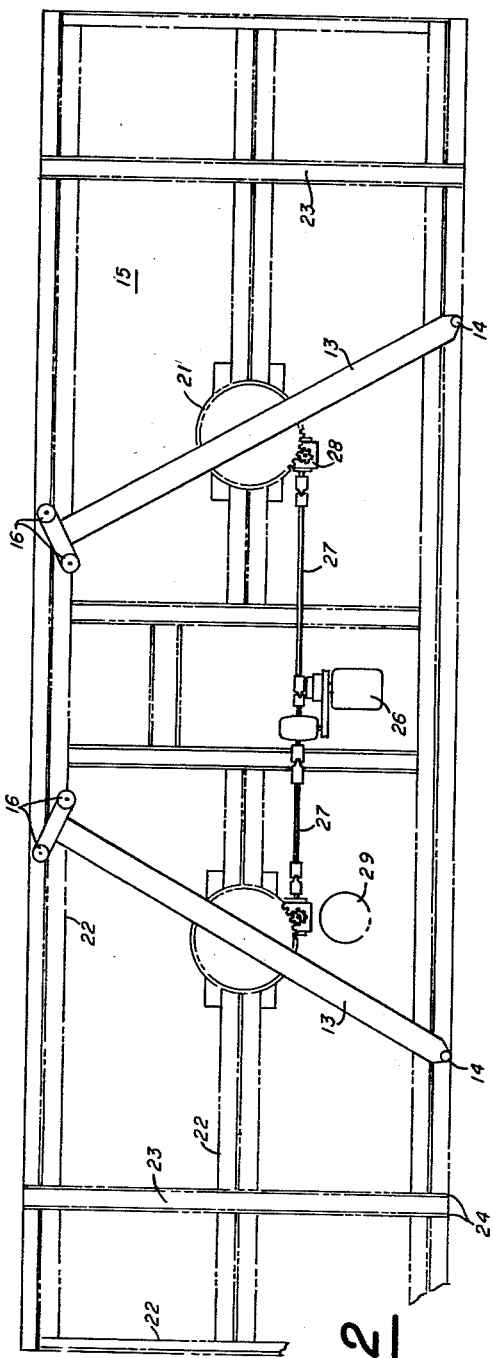
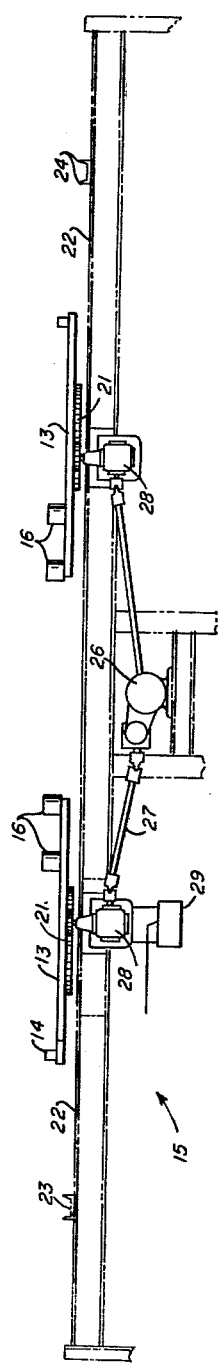
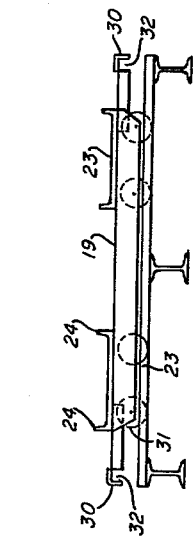
FIG. 2
FIG. 3
FIG. 4
INVENTOR.
RALPH M. ENGLISH

INVENTOR.
RALPH M. ENGLISH

June 22, 1965 R. M. ENGLISH 3,190,467
AUTOMOBILE PARKING SYSTEM
Filed Dec. 26, 1962 8 Sheets-Sheet 4
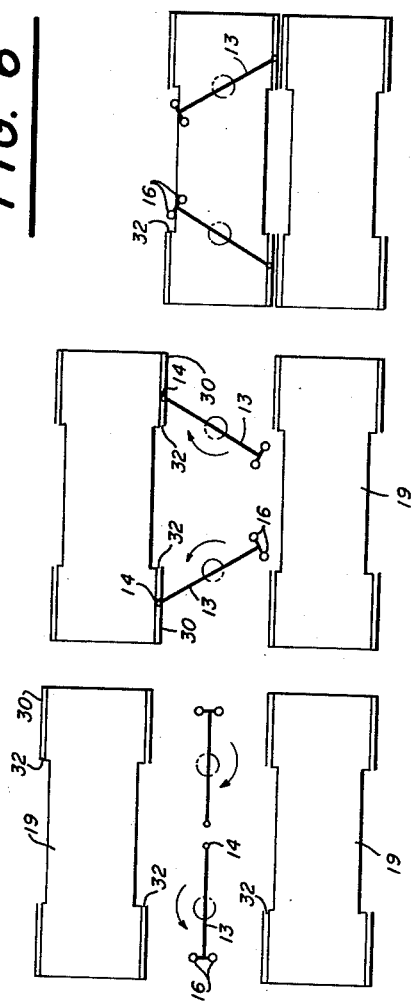
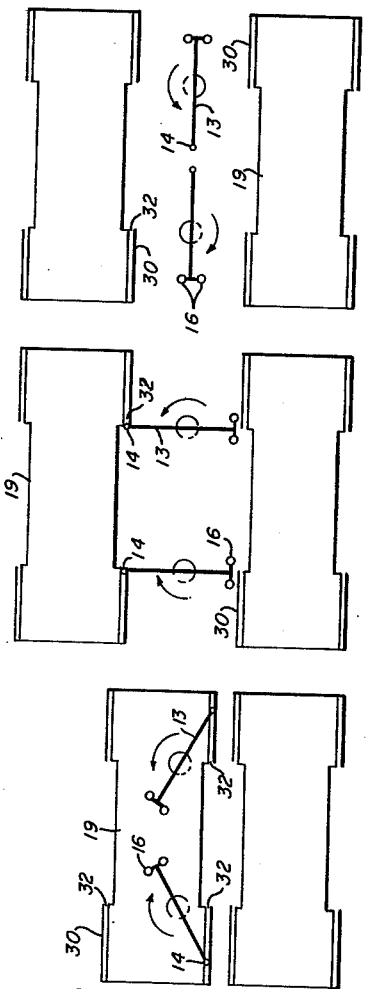
INVENTOR.
RALPH M. ENGLISH

INVENTOR.
RALPH M. ENGLISH

June 22, 1965  R. M. ENGLISH  3,190,467
AUTOMOBILE PARKING SYSTEM
Filed Dec. 26, 1962  8 Sheets-Sheet 6
FIG. 9
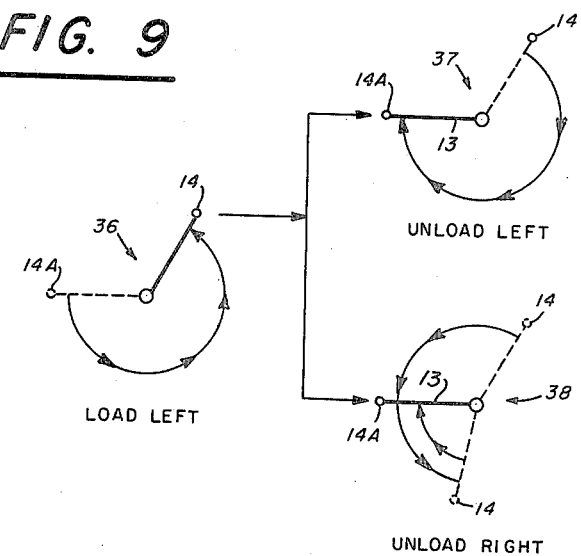
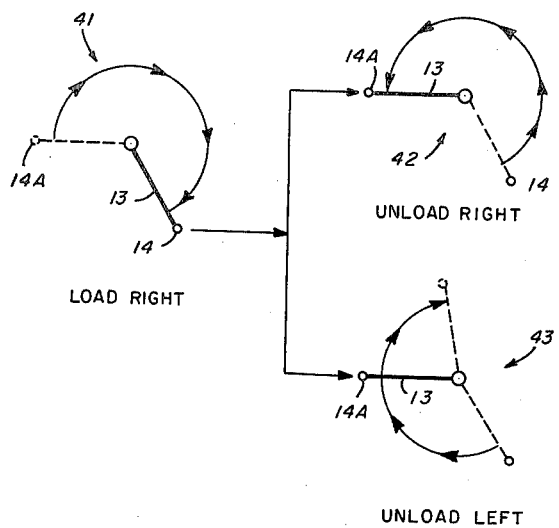
FIG. 10
INVENTOR.
RALPH M. ENGLISH ature of claim

United States Patent Office 3,190,467
Patented June 22, 1965

3,190,467
AUTOMOBILE PARKING SYSTEM
Ralph M. English, 4049 34th St., San Diego, Calif.
Filed Dec. 26, 1962, Ser. No. 246,934
2 Claims. (Cl. 214—16.1)

This application is a continuation-in-part of my copending application Serial No. 110,099, filed May 15, 1961, and now abandoned.

This invention relates to an improved automobile parking system and more particularly to an improved automobile parking system in which the automobile carriage mechanism for a given automobile stays with a particular automobile the entire period it is parked and more specifically to an improved automobile parking system in which the automobile carriage mechanism is moved on and off in elevating mechanism by at least one reversible cam arm.

The general parking system of the present invention is similar to the parking system disclosed in the above referenced co-pending application. The difference between the instant system and the system disclosed in said co-pending application lies in the novel means of moving the pallets on which the cars are parked laterally unto and off the elevating means.

According to the present invention, each pallet is equipped on opposite edges thereof with a cam bracket. The elevating mechanism has mounted thereon at least one reversible rotatable cam arm mechanism. For loading the elevator from either side the cam arm rotates positioning a cam within the aforementioned bracket on the side of the pallet to be loaded. As the cam arm continues to rotate the pallet is pulled onto the elevator since the cam is trapped within the cam bracket and the pallet follows. If the pallet is to be unloaded on the same side that it was loaded from the cam arm is reversed and the trapped cam pushes the pallet off much in the same manner that it was pulled on the elevator, at which time the cam arms revert to their initial starting position. If the pallet is unloaded to the opposite side from which it was loaded, the cam on the opposite end of the cam arm from the loading cam pushes the pallet off the elevator by continued rotation of the cam arm in the same direction. Again the cam arm then reverts to its original starting position. Because the pallets may be loaded from either side and then unloaded on either side a total of six operations are provided, i.e. loading from the left, loading from the right, unloading to the left from a left loading, unloading to the right from a left loading, unloading to the left from a right loading, and unloading to the right from a right loading. This will be more thoroughly understood with reference to the following detailed description.

It is thus an object of the present invention to provide a pallet for the carrying of an automobile which is easily movable in a transverse direction.

Another object of the invention is the provision of an improved automobile parking system which is extremely simple to operate and requires a minimum of human operators.

Yet another object of the present invention is to provide an automobile parking system which is economical to construct.

Still another object of the invention is the provision of an automobile parking system which is fast and relatively trouble-free.

A still further object of the present invention is to provide a pallet type automobile parking system utilizing a pallet moving mechanism which is extremely reliable and requires a minimum of power and equipment.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 2 shows a plan view of the elevator;

FIG. 3 shows a side elevation of the cam arm mechanism of FIG. 2;

FIG. 4 illustrates a cross section of a pallet, utilized in the present invention;

FIG. 6 is a schematic showing one cycle of pallet movement;

FIG. 7 is a schematic showing another cycle of pallet movement;

FIG. 9 is a schematic showing arm rotation through three cycles of pallet movement;

FIG. 10 is a schematic representation of showing of cam arm movement throughout the other three cycles of pallet movement;

Figure 1:
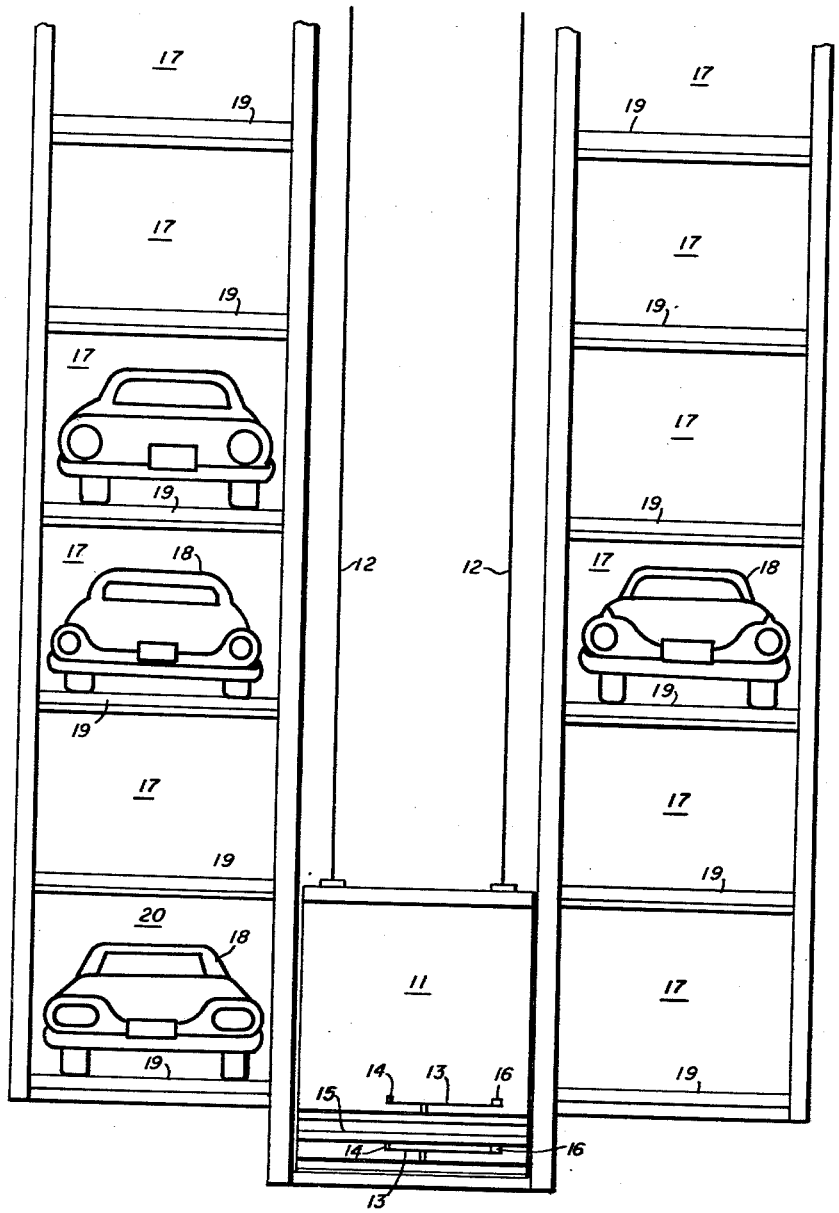
FIG. 1 shows a structural picture of the elevator and stalls of the present invention.

Referring to FIG. 1 there is shown an elevator mechanism at 11 carried by cables 12 and having mounted thereon cam arm 13 with cams 14 and 16. Elevator 11 travels between two row of vertically stacked parking stalls having automobiles 18 parked therein on pallets 19. Platform 15a carries another cam arm 13a with cams 14a and 16a.

Referring to FIG. 2 there is shown a plan view of platform 15 of elevator 11 and cam arm 13 with cams 14 and 16 mounted thereon carried by gear 21. Platform 15 is generally comprised of structural members 22. Raceways 23 communicate with raceways 23, 24 of adjoining parking stalls for the rolling thereon of the pallets. Motor 26 is geared to shaft 27 which is mechanically coupled to gear box 28 which in turn is geared to gear 21.

FIG. 3 shows elevator platform 15 having mounted thereon gear 21, cam arm 13 and cams 14 and 16. Gear 21 is mechanically coupled to gear box 28 which is coupled to shaft 27 and motor 26 also coupled to gear box 28 is cam drum 29.

Referring to FIG. 4 there is shown pallet 19 having roller wheels 31 riding in raceways 23. Wheel brackets 24 guide an automobile to be parked thereon. Cam brackets 32 are shown mounted on each edge of pallet 19.

Figure 5:
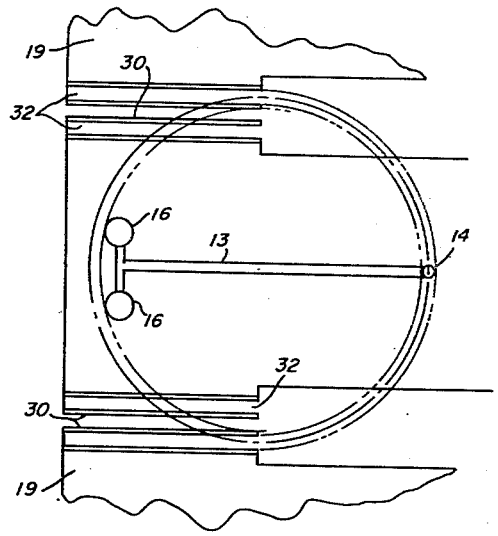
FIG. 5 is a fragmentary view showing the cam arm location with respect to the pallets.

Referring to FIG. 5 there is shown a fragmentary plan view of the cam arm 13 with cams 16 and 14 located with reference to pallets 19 and their associated cam brackets 32.

Figure 8:
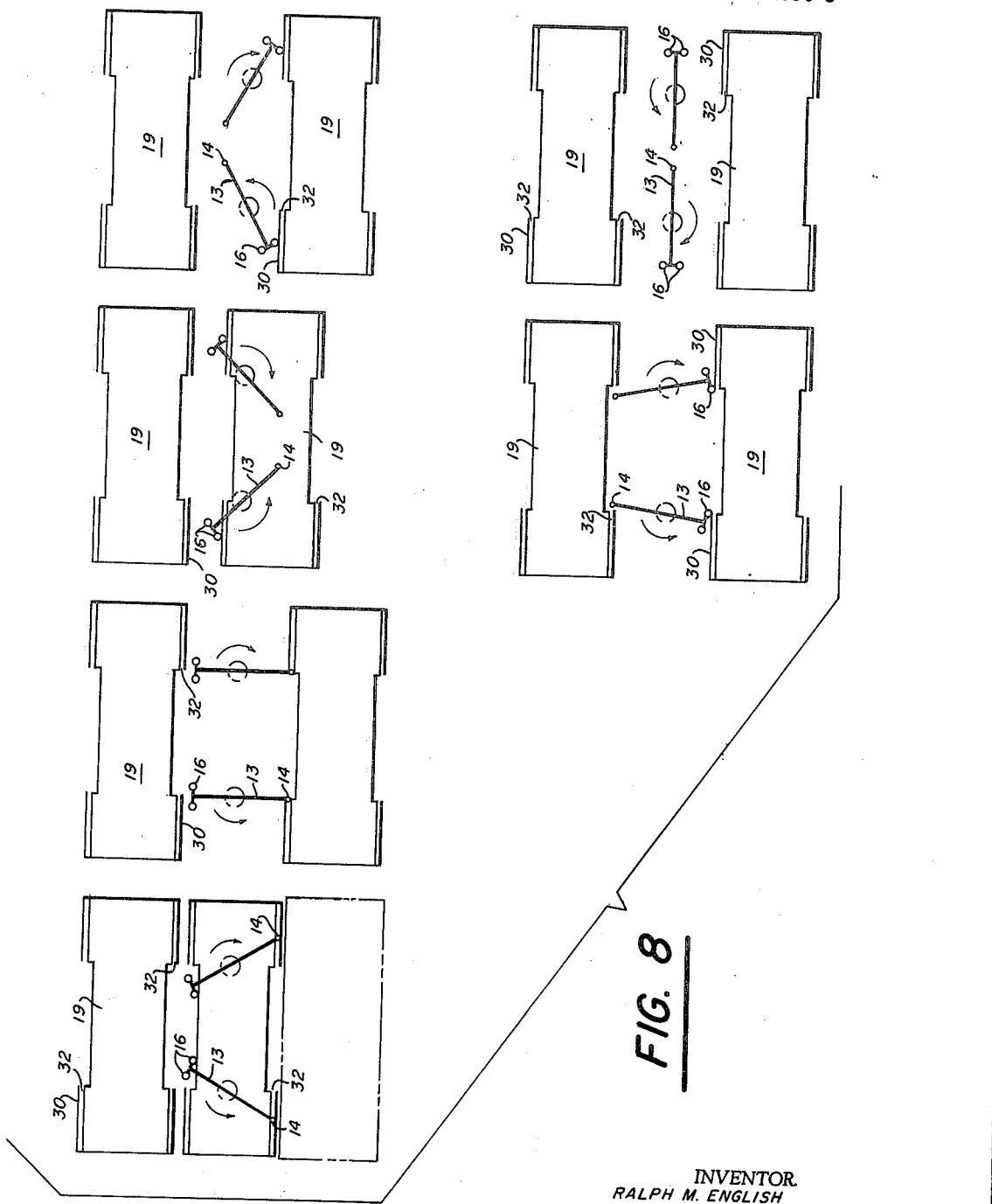
FIG. 8 is a schematic representation of still another cycle of pallet movement.

FIGS. 6, 7 and 8 show pallets 19 with their associated cam brackets 32 and cam arms 13 with cams 16 and 14 in various positions of their load and unload cycles. The arrows denote directions of rotation in a given point of the depicted cycles of operation.

FIG. 9 shows angular movement 36 taken by one cam arm 13 and cam 14 during one cycle of operation, angular movement 37 shows cam arm 13 and cam 14 during cycle of operation, and angular movement 38 shows the movement taken by cam arm 13 and 14 during a third cycle of operation.

Referring to FIG. 10 angular movement 41 shows a movement of cam arm 13 and cam 14 through a fourth cycle of operation, angular movement 42 shows the movement of cam arm 13 and cam 14 through a fifth cycle of operation, and angular movement 43 shows the movement of cam arm 13 and cam 14 through a sixth cycle of operation.

Figure 11:
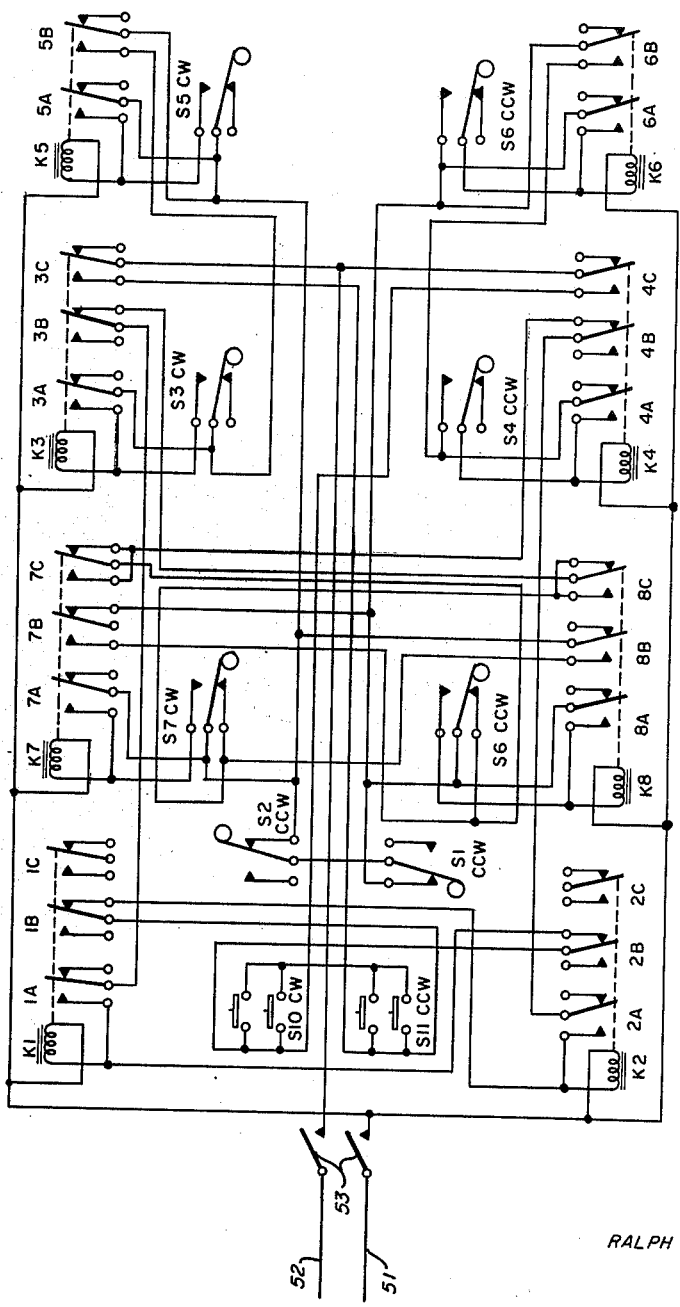
FIG. 11 is a schematic of the electrical control system.

Referring to FIG. 11 there is shown power lines 51 and 52 having switch 53 in series therewith. Power line 51 connects to one terminal each of relay windings K1, K2, K3, K4, K5, K6, K7 and K8. Relay K1 has associated contacts 1a, 1b and 1c, relay K2 has associated contacts 2a, 2b and 2c, relay K3 has associated contacts 3a, 3b and 3c, relay K4 has associated contacts 4a, 4b and 4c, relay K5 has associated contacts 5a and 5b, relay K6 has associated contacts 6a and 6b, relay K7 has associated contacts 7a, 7b and 7c, and relay K8 has associated contacts 8a, 8b and 8c. Relays K3, K4, K5, K6, K7 and K8 have associated cam operated switches S3, S4, S5, S6, S7 and S8. Cam operated switch S1 is in series with power line 52 going to relay K4, K6 and K8, and in series with holding contact 2a of solenoid K2. Cam operated switch S2 is in series with power lead 52 to relays K3, K5 and K7 and in series with holding contacts 1a of relay K1. Manually operated switch S10 is in series with power line 52 and relay K1. Manually operated switch S11 is in series with power line 52 and relay K2.

Figure 12:
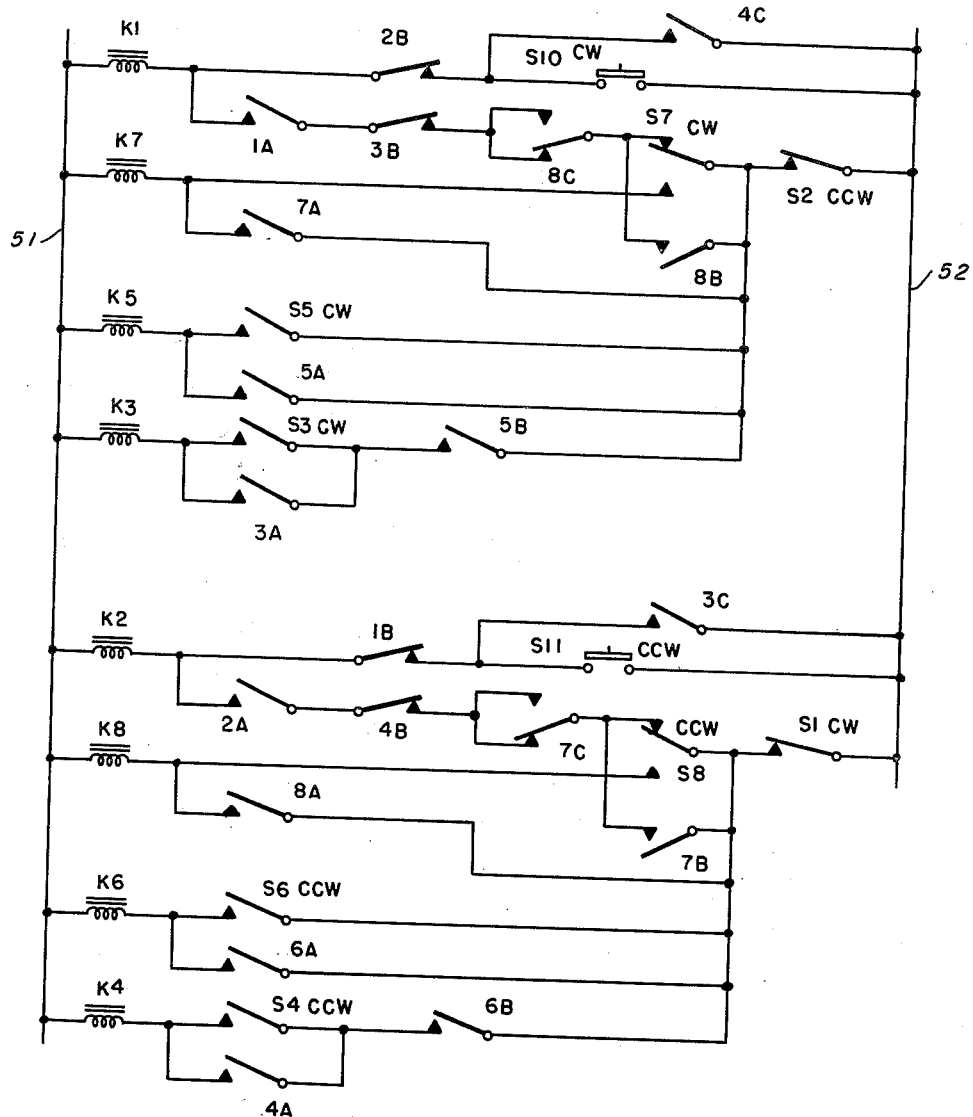
FIG. 12 is a functional ladder diagram of the circuit of FIG. 11.

Referring to FIG. 12 there is shown a ladder power distribution diagram of the schematic of FIG. 11. The difference between FIG. 12 and FIG. 11 is that the relay contacts in FIG. 11 are shown physically located with respect to their actuating solenoids whereas in FIG. 12 the relay contacts are not shown in physical proximity to their actuating solenoid. The purpose of FIG. 12 is to enable to more easily follow the sequential power distribution that is possible in FIG. 11.

Figure 13:
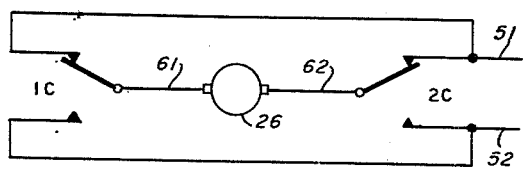
FIG. 13 is a schematic of the motor circuit.

FIG. 13 shows motor 26 having input leads 61 and 62 connected through contacts 1c and 2c, respectively, of relays K1 and K2, respectively, to power lines 51 and 52.

*Operation*

Referring back to FIG. 1, a car to be parked is driven into stall 20 on a waiting pallet 19. At this time a switch is closed (FIGS. 11 and 12) energizing circuitry which causes cam arm 13 to rotate, engaging a cam bracket (not shown) on the edge of pallet 19, and pulling pallet 19 together with car 18 out of stall 20 unto elevator platform 15 of elevator 11. At that time limit switches operated by the rotating mechanism and associated circuitry stop the rotation of cam arm 13. A level is then selected through conventional elevator means and elevator 11 is raised to the desired level, which brings platform 15a level with the original stall 20. A second switch is closed (FIGS. 11 and 12) which pushes spare pallet 19a off platform 15a, via cam arm 13a, to await the next car to be parked. A second level is then selected through conventional elevator means, which is the level of the stall the car is to be parked. Platform 15a is brought to this level, and the empty pallet in the selected stall loaded thereon. At this time platform 15 is brought to the level of this stall and its pallet together with the car thereupon unloaded therein, again via cam arm 13 and cams 14 and 16 as will be explained below. A switch is again closed which activates circuitry to cause cam arm 13 to rotate one way or the other pushing or pulling pallet 19 together with automobile 18 off elevator platform 15 and into one of the selected stalls 17.

Referring to FIG. 2, some of the detail of the cam arm 13 and cams 14 and 16 is shown. Motor 26 is a reversible motor rotating in one direction or the other depending upon the polarity or phase of the power applied thereto. Motor 26 is mechanically coupled to shaft 27 which will then rotate in a direction depending upon the direction of the rotation of the motor. Shaft 27 is coupled to gear box 28 which in turn has an output which drives gear 21 on which is mounted cam arm 13. Assuming the elevator is unloading as shown, arm 13 will then rotate in one direction or the other and cam 14 will slide into a cam bracket on one of the adjoining pallets (not shown) pulling the pallet along raceways 24 and 23 to the center of the elevator. Members 22 are merely for structural support. Gear box 28 is also geared to a cam 29 on which are mounted various switches which are opened and closed at varying degrees of rotation to control motor 26 and thus the rotation of cam arm 13.

Referring to FIG. 3 there is shown a side elevation of the elevator and cam arm mechanism. Again motor 26 is coupled mechanically to shaft 27 which in turn is coupled to gear box 28. The output of gear box 28 drives gear 21 on which is mounted cam arm 13. Again, cam arm 13 rotates in one direction or another depending upon the direction of rotation of motor 26.

Referring again to FIG. 4, there is shown one of the pallets 19 in more detail. Pallets 19 are mounted on wheels 31 which ride in the tracks 23 previously mentioned. Each pallet has mounted thereon wheel brackets 24 for driving an automobile thereon. Cam brackets 32 are mounted on two opposite edges of pallet 19 for receiving cam 14 on cam arm 13 (FIG. 3). In one phase of the pallet moving cycle when cams 16 of cam arm 13 push pallets 19, the cams 16 push against surfaces 30 of cam brackets 32 as will be explained below.

Referring to FIG. 5, the cam and cam arm rotation as shown with respect to the pallet location both in parking stalls and loaded on the elevator. Referring to the top pallet 19 it can be seen that cam 14, if cam arm 13 is rotated counter clockwise, will lodge in cam bracket 32 and pull pallet 19 toward the center. Conversely, if cam arm 13 is rotated clockwise cam 14 will be lodged in the cam bracket 32 of lower pallet 19 and lower pallet 19 will be pulled toward the center. It can also be seen from this drawing that as cam arm is rotated edges 30 of the top and bottom pallets 19, are tangent to the circle generated by cams 16. Thus, in a pushing operation, cam 16 will push pallets 19 via edge 30 of cam brackets 32 to the proper position for later pick up by cam 14.

Referring to FIG. 6, one of the six operations performed by cam arm 13 is schematically shown. On the left side, labeled start position, the left cam arm 13 is made to rotate counter clockwise and the right cam arm 13 is made to rotate clockwise as depicted by the arrows. Referring to the center portion of FIG. 6, cams 14 have now engaged cam brackets 32 of pallet 19 and have begun to pull pallet 19 towards the center. Referring to the right portion of FIG. 6 the pallet 19 being pulled by cams 14 is shown in the loaded position, i.e., on the elevator platform. At this point, the cam arms 13 are stopped as depicted by arrows going in both directions, and is ready to be unloaded either to the right or to the left.

Referring to FIG. 7, cam arms 13 have begun to rotate in an opposite direction from which they were rotating in FIG. 6 for unloading the pallet 19 into a stall in the same direction in which it was loaded in FIG. 6. Referring to the center portion of FIG. 7, the pallet movement has stopped and cams 14 are about to disengage from cam brackets 32. Referring now to the right portion of FIG. 7 the cam arms 13 have returned to the original start position as shown in the left portion of FIG. 6.

Referring to FIG. 8, the position shown at the left is the same as that shown at the right of FIG. 6, i.e., when a pallet has been fully loaded from a stall corresponding to a top stall in this diagram. The rotational movements of the cam arm 13 will be described as the pallet now loaded is unloaded in one of the bottom stalls. The direction of rotation of the two cam arms is continued counter-clockwise on the left and clockwise on the right as when loaded in FIG. 6. This further pushes the pallet down, as shown in the second frame, and cams 14 leave cam bracket 32, whereby upon further rotation of cam arms 13 cams 16 push against surface 30 of cam brackets 32, pushing pallet 19 down in the diagram until they disengage, as shown in the next to the last frame, at which time a limit switch is tripped and the cam arms are reversed in rotational direction to the starting position, as shown in a frame at the right.

Referring now to FIG. 9, three cycles of rotation are shown schematically of cam arms 13. This direction depicts the movement of the cam arm to the right of FIGS. 6, 7 and 8 when loading from the opposite side as shown in FIG. 6. To begin with, the start position is shown at 14a of cams 14 and it is rotated counter clockwise approximately 260 degrees where it is stopped by a limit switch for unloading. If it is desired to unload a pallet in the same direction as it was loaded the direction of rotation is merely reversed, as in FIG. 7, and the cam arm returned to its starting position. If, however, it is desired to unload the pallet to the opposite side to which it was loaded the cam arm 14 is reversed from its loading direction and rotated approximately 190 degrees, when it is reversed again and returns to its starting position at 14a. This type of operation was described in FIG. 8, but FIG. 8 showed a loading from the top and unloading from the bottom, whereas FIG. 9 depicts a loading from the bottom.

Referring to FIG. 10, a loading from the top as shown in FIG. 6, is described in the first arc of rotation whereby cam arm 13 is rotated approximately 260 degrees from its starting position at 14a to the position shown at 14. At this point a limit switch is tripped and the pallet movement is stopped awaiting proper elevation. If it is desired to unload the pallet in the same direction as in FIG. 7 the rotation of cam arm 13 is merely reversed back to its starting position at 14a as shown on the top right leg of FIG. 10. If it is desired that the pallet be unloaded to the opposite side of stalls, rotation is continued in the same direction. Cam arm 13 was initially rotated for loading approximately 170 degrees and then reversed back to position 14a which again is its starting position. This operation is shown in FIG. 8.

Thus, in order to load a pallet from either side and then unload it to either side, it is necessary to provide for six separate cycles of cam arm rotation. This would be (one) a loading from one side, (two) an unloading to the same tide, (three) an unloading to the opposite side, (four) a loading from the other side, (five) an unloading to the same side, and (six) an unloading to the opposite side. The control circuitry necessary for these cycles of operation is shown in FIGS. 11, 12 and 13.

Referring to FIGS. 11, 12 and 13, and in particular to 13, the power from leads 51 and 52 is applied to motor 26 through relay contacts K1c and K2c of relays K1 and K2 respectively. Since all relay contacts are shown with the solenoids deenergized, it can be seen that energizing either relay K1 or K2 will result in power being applied to motor 26, which will be opposite in phase or polarity (for reversible rotation of motor 26) depending upon which relay winding is energized. For purposes of explanation, when relay K1 is energized and contacts K1c are dropped, the motor is taken to be operating in a clockwise direction, and when relay K2 is energized and contacts K2c are dropped, the motor 26 is moving in a counter clockwise direction. With this premises K1, K3, K5 and K7 are generally considered to be clockwise relays and K2, K4, K6 and K8 will be generally considered to be counter clockwise relays. Thus, if clockwise switch S10 is depressed (FIGS. 11 and 12) solenoid K1 is energized, dropping contacts K1c and causing motor 26 to rotate in a clockwise direction. Conversely, if counter clockwise switch S11 is depressed, solenoid K2 is energized dropping contacts K2c, causing motor 26 to be rotated in a counter clockwise direction.

Figure 14:
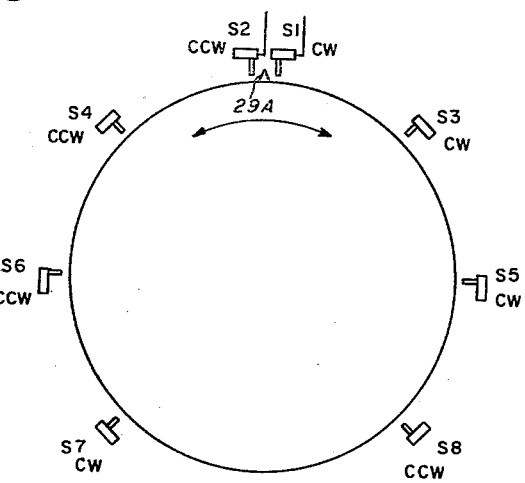
FIG. 14 is a schematic representation of a switch cam.

Referring to FIG. 14, the physical location of the micro switches around cam drum 29 are depicted schematically. At this point it is emphasized that the switches associated with clockwise movement, i.e., S1, S3, S5 and S7 are only actuated upon clockwise rotation of the cam drum, conversely, the switches associated with counter clockwise rotation, i.e., S2, S4, S6 and S8, are only actuated or thrown during counter clockwise rotation of cam drum 29. These are one-way actuated micro switches. These switches close momentarily as the cam 29a passes by each switch in the proper direction. The opposite direction cam 29a has no effect on the switch it passes. The cam as shown in FIG. 14 is shown at the start positions of FIGS. 6, 9 and 10.

Now referring to either FIG. 11 or FIG. 12 and FIGS. 13 and 14, an explanation of the control circuitry will follow. Assuming the initial operation, i.e., loading, of FIG. 9 is desired, counter clockwise switch S11 is depressed supplying power to solenoid K2 directly from line 51 and line 52 through back contacts K1b and S11. At the time solenoid K2 is energized holding contacts K2a closed providing a holding circuit through contacts K4b, K7c, S8 and S1. At this time motor 26 will begin its counter clockwise rotation. Switch S2 will be momentarily opened first which will have no effect since none of the clockwise solenoids are energized. Switch S4 is then momentarily closed but has no effect because open contact K6b is in series therewith. Switch S6 is momentarily closed which energizes relay K6 which closes holding contacts 6a and closes contact 6b. When S8 is thrown, the holding circuit of solenoid K2 is opened and the motor stops. At the same time relay K8 is energized closing holding contacts 8a and 8b (shorting out the back contacts of S7 and slipping to the upper position of 8c). This has no effect upon counter clockwise rotation. At this point, the pallet is loaded as shown in FIGS. 6 and 9.

Assuming now it is desired to unload the pallet in the same direction that it was loaded, clockwise switch S10 is depressed energizing K1 which in turn closes holding contact K1a, motor contact K1c and opens the starting circuit of K2 via contact 1b. Counter clockwise solenoids K6 and K8 at this time are energized and the cam drum of FIG. 14 begins its clockwise rotation tripping first switch S1. Switch S1 opening momentarily deenergizes solenoids K6 and K8, contact 8c momentarily breaking the holding circuit of relay K1 and clockwise rotation stops at its starting position.

If it were desired to unload the pallet from the opposite direction, switch S11 is depressed again energizing relay K2, and as soon as motor 26 moves drum 29 switch S8 reverts to its upper position cooperating with holding contact 2a to hold relay K2 energized. As the counter clockwise rotation continues, switch S2 opens momentarily having no effect at this time, followed by S4 closing. S4 at this time will energize K4 since winding K6 has been left energized by loading cycle and contact K6b is closed. When contact 4a then holds relay K4 energized, K4b opens the holding circuit of K2 stopping motor 26, and K4c closes and energizes relay K1 starting the motor in a clockwise direction. When cam 29a trips switch S1 relays K4, K6 and K8 deenergize opening contact 4c and tripping contact 8c, causing relay K1 to deenergize, which stops motor 26 at the start position as desired.

With reference to FIG. 13, should a faulty contact cause solenoids K1 and K2 to both operate at the same time it can be seen that the motor will then be shorted across input terminal 52 instead of input terminal 51, as now shown. Thus, the incoming line cannot be shorted nor can motor 26 be damaged, of relay malfunction.

The exact reverse cycle would take place if the loading were accomplished by depressing the clockwise button S10. Unloading to the same side would be merely accomplished by a simple reversal, i.e., by depressing S11 after switch S7 were actuated, and unloading to the opposite side could result in a comparable cycle as above described by again depressing S10 to start the motor moving again in the same direction as it was moving on the loading cycle.

The control circuitry and means of elevation have not been shown since this does not form a part of the instant invention, but any well known and conventional elevation expedient may be used as will be understood by those skilled in the art.

It should be understood, of course, that the foregoing disclosure relates only to a preferred embodiment of the invention and that it is intended to cover all changes and modifications of the example of the invention herein chosen for the purposes of the disclosure, which do not constitute departures from the spirit and scope of the invention.

What is claimed is:

1. In an automobile parking system of the type having a multiplicity of parking spaces disposed vertically and horizontally on each side from an elevator shaft with elevation means disposed therein, an improved conveyer mechanism comprising a plurality of pallets, each of said pallets being of suitable dimensions and strength for the carriage of an automobile thereon, and cam means comprising a pair of reversible centrally supported cam bars, each of said cam bars comprising first and second arms extending in diametrically opposite directions, each of said first arms having a first cam on one end thereof for pulling and pushing said pallet transverse to said shaft, and each of said second arms having a second cam on the other end thereof for pushing said pallet transverse to said shaft and means for rotating said cam bars in opposite directions to each other in a first cycle of operation for loading said elevator means with a pallet from a first side thereof, a second cycle of operation for unloading said pallet to said first side thereof after the loading thereof from said first side, a third cycle of operation for unloading said pallet to second side of said elevating means after the loading thereof from said first side, a fourth cycle of operation for loading said pallet from a second side of said elevating means, a fifth cycle of operation for unloading to said second side of said elevating means after the loading thereof from said second side, a sixth cycle of operation for the unloading of said pallet from said elevating means to said first side thereof after the loading thereof from said second side thereof.

2. An automobile parking system comprising an elevator shaft containing elevating means therein, a plurality of parking stalls stacked vertically in two columns on each side of said elevator shaft, a plurality of pallets each having a plurality of sets of lateral rollers and cam brackets on two opposite edges thereof, the number of pallets equaling the number of parking stalls, one of said pallets located in every parking stall, said elevating means adapted to receive a pallet on the top side thereof and a spare pallet underneath the top side thereof, each of said stalls and said elevating means having aligned lateral roller tracks adapted to receive said lateral rollers, and reversible cam drive means mounted on said elevating means for engaging said cam brackets on said pallets said cam means comprising a pair of reversible centrally supported cam bars, each of said cam bars comprising first and second arms extending in diametrically opposite directions, each of said first arms having a first cam on one end thereof for pulling and pushing said pallet transverse to said shaft and each of said second arms having a second cam on the other end thereof for pushing said pallet transverse to said shaft and means for rotating said cam bars in opposite directions to each other in a first cycle of operation for loading said elevating means with a pallet from a first side thereof, a second cycle of operation for unloading said pallet to said first side thereof after the loading thereof from said first side, a third cycle of operation for unloading said pallet to second side of said elevating means after the loading thereof from said first side, a fourth cycle of operation for loading said pallet from said second side of said elevating means, a fifth cycle of operation for unloading said pallet to said second side of said elevating means after the loading thereof from said second side, a sixth cycle of operation for the unloading of said pallet from said elevating means to said first side thereof after the loading thereof from said second side thereof whereby upon actuating said cam drive means said pallet will be moved in a direction transverse to said elevating means and said parking stalls.

References Cited by the Examiner
UNITED STATES PATENTS

| | | | |
|---|---|---|---|
| 1,911,015 | 5/33 | Crabbe et al. | 214—16.1 X |
| 1,969,419 | 8/34 | Martin | 214—16.1 |
| 2,412,009 | 12/46 | Rickland | 214—16.1 |
| 2,945,604 | 7/60 | Kroll et al. | 214—16.1 |

FOREIGN PATENTS

| | | |
|---|---|---|
| 860,928 | 12/52 | Germany. |

HUGO O. SCHULZ, *Primary Examiner.*

GERALD M. FORLENZA, *Examiner.*